Jan. 8, 1924.

R. R. AMBLER ET AL

ABRADING MACHINE

Filed April 11, 1922

Inventors
Robert R. Ambler.
George F. Wilson.
By Robert McPerson
Atty.

Jan. 8, 1924.
R. R. AMBLER ET AL
ABRADING MACHINE
Filed April 11, 1922    3 Sheets-Sheet 2
1,480,332
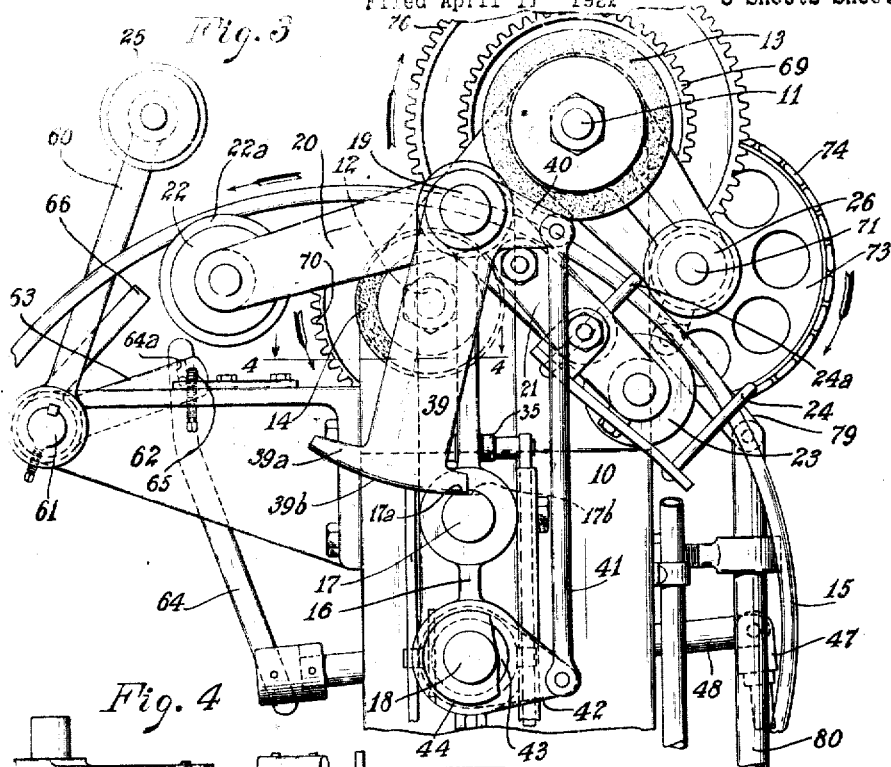
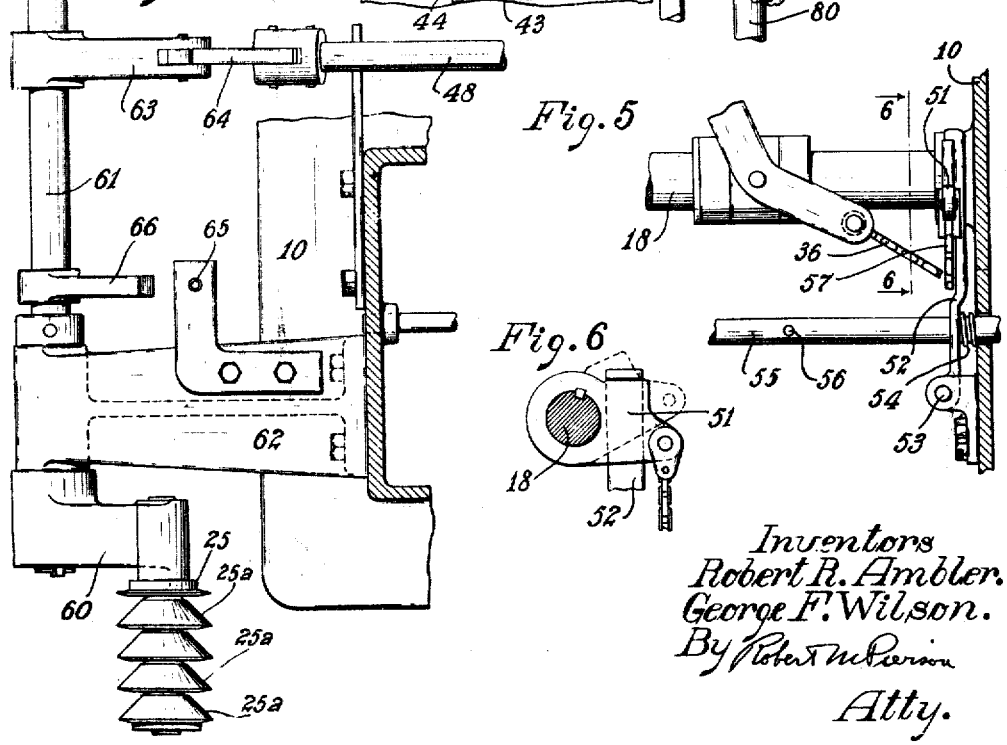
Inventors
Robert R. Ambler.
George F. Wilson.
By Robert M. Pierson
Atty.

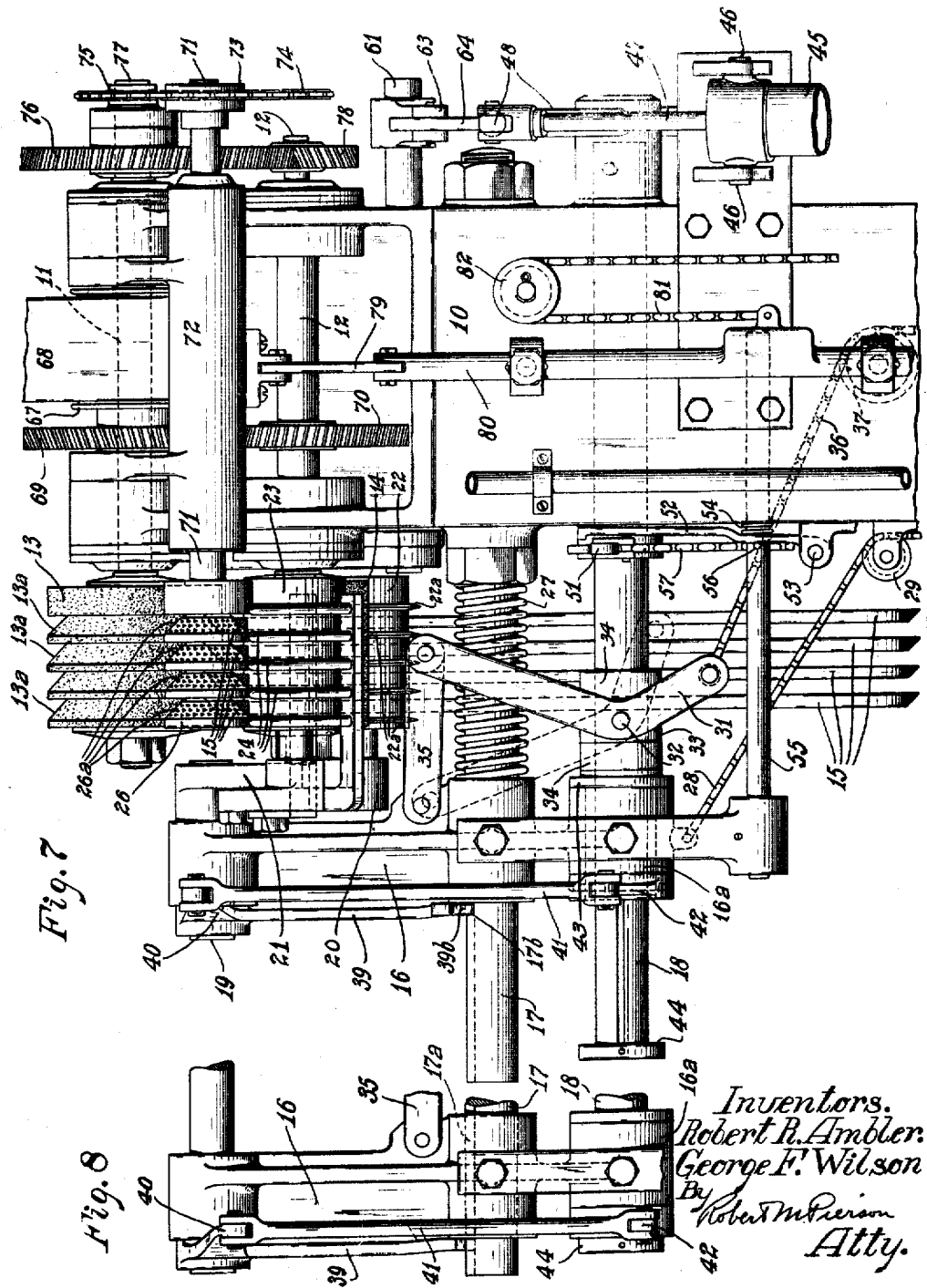

Patented Jan. 8, 1924.

1,480,332

UNITED STATES PATENT OFFICE.

ROBERT R. AMBLER AND GEORGE F. WILSON, OF AKRON, OHIO, ASSIGNORS TO THE B. F. GOODRICH COMPANY, OF NEW YORK, N. Y., A CORPORATION OF NEW YORK.

ABRADING MACHINE.

Application filed April 11, 1922. Serial No. 551,467.

*To all whom it may concern:*

Be it known that we, ROBERT R. AMBLER and GEORGE F. WILSON, citizens of the United States, residing at Akron, in the county of Summit and State of Ohio, have invented a certain new and useful Abrading Machine, of which the following is a specification.

This invention relates to abrading machines and more particularly to apparatus for abrading annular articles such as the reinforcing members called beads which are commonly used in pneumatic tires. A common type of bead is composed of an inextensible metal core, a body of rubber thereon and a rubberized fabric cover, the whole being usually of triangular cross-section, and after partial vulcanization the bead requires to be buffed in order to roughen the fabric cover and thereby provide for good adhesion between the bead and the rubber cement with which it is coated before it is incorporated in the tire.

Our general object is to provide a rapid, efficient and economically constructed machine, whereby labor and expense may be saved and a high quality in the product obtained. More specific objects are to provide an improved machine in which abrading wheels of rigid material such as carborundum may be used as the abrading elements without danger of breakage and injury to the operator from flying particles of such wheels, and to provide improved means for guiding the work past such wheels in abrading contact therewith and for automatically so retarding it as to produce a uniform relative movement between the working surfaces of the abrading wheels and the work.

Of the accompanying drawings:

Fig. 3 is a similar view of parts of the machine in inoperative or work-receiving position.

Fig. 4 is a detached plan of part of the machine, a part thereof being sectioned on line 4—4 of Fig. 2.

Fig. 5 is a fragmentary view of a latching device for the power-applying mechanism, in latching position, and adjacent parts.

Fig. 6 is a section on line 6—6 of Fig. 5.

Fig. 7 is a side elevation of the principal parts of the machine, in operative position.

Fig. 8 is a similar view of a part shown in Fig. 7, in inoperative or work-receiving position.

Figure 1:
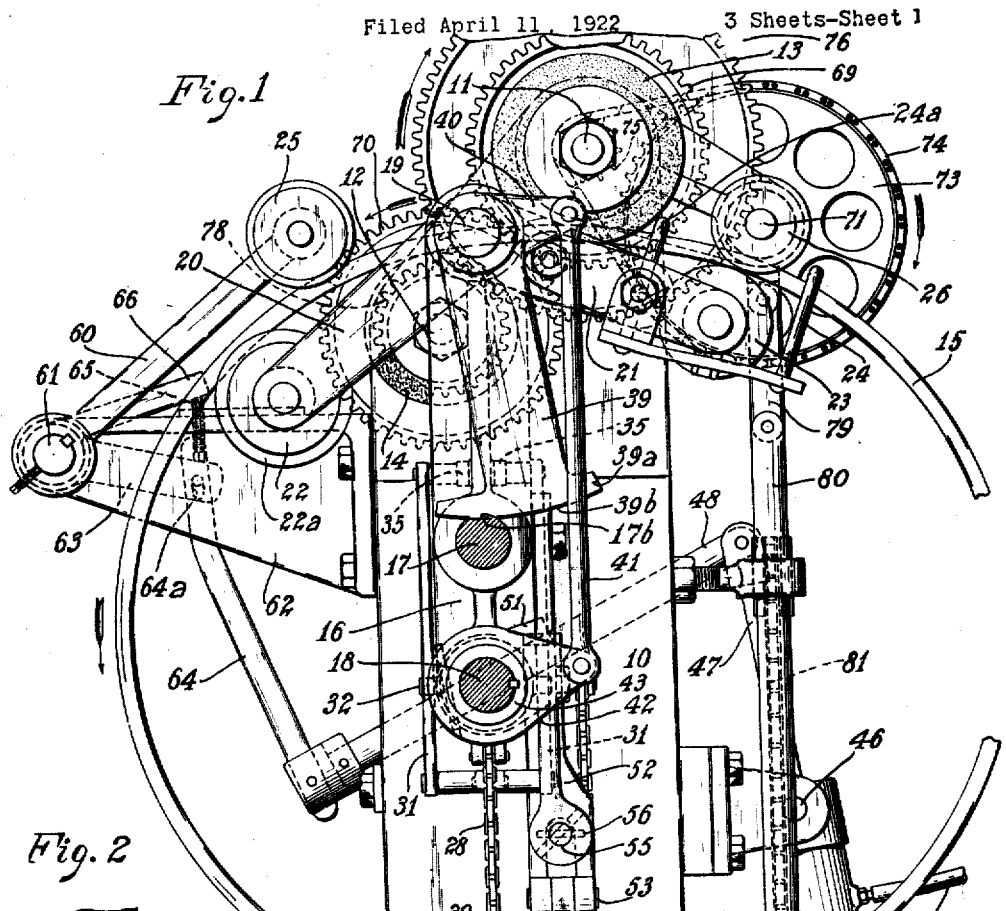
Fig. 1 is a front elevation of a preferred embodiment of our invention, in operative position, as viewed from the position of the operator, with parts broken away and parts in section.
Figure 2:
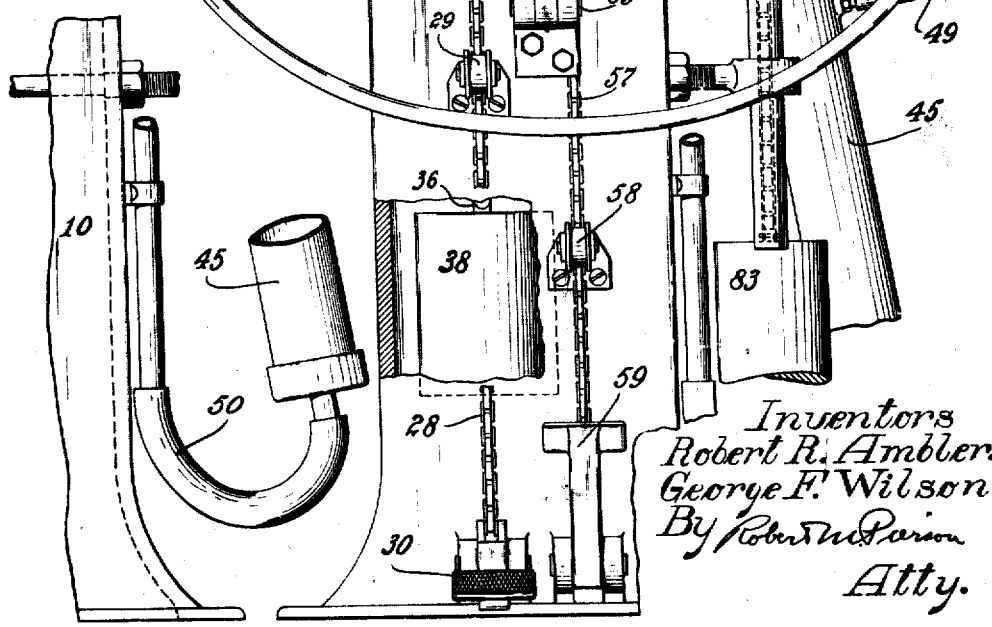
Fig. 2 is a fragmentary view of a power-cylinder and adjacent parts.

In the drawings, 10 is an upright frame in which are journaled parallel, horizontal shafts 11, 12 for a pair of abrading wheels 13, 14, preferably of carborundum, said wheels being secured an alignment with each other on the overhanging or projecting front ends of said shafts, so that they may freely receive between them the work, here consisting of annular tire-beads 15, 15, when the latter are moved axially from the front of the machine into association with said abrading wheels. The parallel shafts 11, 12 are offset from each other both vertically and horizontally, as is clearly shown in Figs. 1 and 3, so that the abrading wheels 13, 14 secured thereon are adapted to contact the work at different stations, without danger of contact with each other or with any other part of the machine, the work being of such stiffness or resilience that it can be held in abrading contact with said wheels by guide rollers, hereinafter described, contacting the work at points somewhat removed from the abrading wheels. The lower abrading wheel 14 is formed with a cylindrical working surface, to correspond to the cylindrical inner faces of the beads, while the upper wheel, 13, is formed with circumferential grooves 13$^a$, 13$^a$, to fit the other two faces of each bead, as will be understood upon reference to Fig. 7, where it will be seen that the beads, 15, which are endless, are of triangular cross-section, thus having three annular faces to be abraded.

For supporting the beads 15 and carrying them into association with the abrading wheels, and pressing them against the latter, we provide a bracket-like carriage 16 slidably mounted upon a horizontal guiding and supporting bar 17 and a rock shaft 18, projecting from the front of the machine, the upper end of said carriage or sliding bracket being formed with a bearing in which is rotatably mounted a short shaft 19, on the rear end of which is secured a two-armed lever 20, 21. On the outer end of the arm 20 of said lever is journaled a guide roller 22 adapted to engage the inner peripheries of a plurality of the beads 15 and provided with circumferential flanges 22ª, 22ª, for spacing said beads apart. On the outer end of the arm, 21, of said lever, is journaled a cylindrical, flangeless guide roller 23, adapted to engage the inner peripheries of the beads, and two sets of guide-posts, 24, 24ª, adapted to space said beads apart, said sets of guide posts being mounted, at respective sides of the guide roller 23, upon lateral projections from the arm 21.

When the shaft 19 is turned to lower the arm 21 and raise the arm 20, from the positions shown in Fig. 1 to those of Fig. 3, certain work-contacting rollers, 25, 26, hereinafter described, being simultaneously removed from the work, the rollers 22, 23, are adapted by their change of position, to tilt the beads 15 out of contact with the abrading wheels 13, 14, so that they may pass freely from between the latter when the carriage 16 is slid outward on its supporting members 17, 18, and said rollers are adapted, by a reverse movement of the carriage 16 and shaft 19, to carry a new set of beads, hung upon said rollers, into abrading relation with said wheels. For driving the carriage 16 away from the abrading wheels, to work-receiving position, said carriage is backed by a compression spring 27 encircling its guiding and supporting bar 17, and for moving it in the opposite direction, against said spring, said carriage is provided with a chain 28 running over a pulley 29 on the frame 10, to a treadle 30.

To assist the spring 27, a pair of levers 31, 31 are fulcrumed at 32 on a collar 33 mounted on the rock-shaft 18 between collars 34, 34 secured to said shaft, the upper ends of said levers being connected with said carriage by a pair of push-links 35, 35, and the lower ends of said levers being connected by a chain 36, passing over a pulley 37, to a weight 38 within the frame 10.

For turning the shaft 19 to move the lever arms 20, 21 with their work-supporting rollers 22, 23 from their abrading position of Fig. 1 to their work-receiving position of Fig. 3, and vice versa, and for holding said rollers in the latter position while the carriage 16 is moved, the front end of said shaft has secured thereon a latching lever 39 formed with a lateral projection 40 from its hub, said projection constituting a rocker-arm and being connected by a link 41 with a rocker-arm 42 pinned to a bushing 43 which is slidably keyed upon the rock-shaft 18 within the bearing 16ª of the carriage 16. 44 is a stop collar on the end of said rock-shaft for limiting the outward movement of the carriage by contact with said rocker-arm.

For turning the rock-shaft 18, we provide a fluid pressure cylinder 45 at the rear of the machine, provided with trunnions 46, 46, on which it is pivotally mounted on the frame of the machine, its piston rod 47 being hinged to the end of a lever 48, said lever being secured at its middle part to the rear end of the rock-shaft 18 and extending beyond said rock-shaft to a connection hereinafter described. 49, 50 are flexible fluid pressure supply pipes running respectively to the upper and lower ends of said cylinder, for charging the same, and any known or suitable form of valve (not shown) may be provided for controlling said cylinder. To insure that the work-supporting rollers 22, 23 will not be thrown into abrading position except when the carriage 16 is at its innermost or abrading position, the lever 39 is formed at its lower end with a latching foot 39ª having an arcuate lower face 39ᵇ, one end of said foot being adapted to slide in a longitudinal latching groove 17ª formed in the upper side of the guide bar 17 when the carriage 16 is moved out of abrading position, as shown in Figs. 3 and 8, and said foot is adapted to pass through a transverse latching slot 17ᵇ, at the inner end of the groove 17ª, as shown in Figs. 1 and 7, to permit the shaft 19 to be turned when the carriage is in its innermost position.

In order that the lower end of the cylinder may be charged before the carriage reaches its innermost position, so it will quickly turn the shaft 19 to abrading position without further action of the operator upon the arrival of the carriage at said innermost position, when the foot 39ª reaches the groove 17ᵇ, the rock-shaft 18 is provided with a laterally extending arm 51 adapted to be engaged by the hooked end of a latching lever 52 when shaft 19 is turned to work-receiving position, and so retained, preventing the turning of said rock-shaft in the opposite direction, although the lower end of the cylinder 45 is charged, until said latching lever is disengaged from said arm. Said latching lever 52 is pivoted at 53 on the frame 10 and urged toward latching position by a compression spring 54 encircling a bar 55 secured at its outer end to the carriage 16 and having its inner end slidably mounted in the frame 10. 56 is a stud on said bar, adapted to strike the lever 52 and disengage the latter from the arm 51, overcoming the spring 54, when the carriage 16 reaches its innermost position, and thereby permitting the previously charged cylinder 45 instantly to turn the rock-shaft 18 and shaft 19, the foot 39ª of the lever 39 passing through the transverse slot 17ᵇ and the bar 17.

For assisting the cylinder 45 in turning the rock-shaft 18 in the reverse direction, to raise the roller 22 and parts hereinafter described, the arm 51 on said rock-shaft is connected by a chain 57, passing downward, past a roller 58, to a treadle 59.

The roller 25 heretofore mentioned is formed with work-spacing grooves 25ª, 25ª (Fig. 4), and is adapted to be lowered onto the work and to ride thereon and hold it down against the abrading wheel 14, as shown in Fig. 1, when the roll 22 is lowered and the roller 23 raised, said roller 25 being journaled at the free end of a lever 60 extending from a rock-shaft 61 mounted in a bracket 62 extending from the frame 10. For turning said rock-shaft an arm 63 is secured to the rear end thereof and connected by a link 64 with the load end of the lever 48. 65 is an adjustable stop-bolt on the bracket 62 adapted to be contacted by an arm 66 secured to the rock-shaft 61 to limit the downward movement of the roller 25, the link 64 having a pin-and-slot connection with the arm 63, as indicated at 64ª, to compensate for adjustment of the stop-bolt 65.

For driving the abrading wheels 13, 14, the shaft 11 of the former is provided with a drive-pulley 67 and a drive belt 68 thereon, and with a gear 69 meshed with a gear 70 secured on the shaft 12 of the abrading wheel 14.

The roller 26 heretofore mentioned is a hold-back roll, adapted to retard the progress of the work past the abrading wheels and thereby obtain the necessary relative movement of the latter on the work, said wheel being formed with circumferential grooves 26ª, 26ª with spiked or roughened surfaces (Fig. 7), fitting the upper sides of the beads 15. Said roller 26 is secured to the front end of a shaft 71 journaled in a heavy bearing member 72 pivoted on the shaft 11, and is adapted to be driven at a slower speed than the abrading rolls, or rather to be held back, by a large sprocket 73 secured to the rear end of its shaft 71 and connected by a sprocket chain 74 with a small sprocket 75 secured upon a common hub with a gear 76 journaled upon a stub-shaft 77 projecting from the frame 10, said gear 76 being meshed with a smaller gear 78 secured upon the rear end of the shaft 12.

The bearing member 72 is adapted to rest upon a part of the frame 10, with the hold-back roller 26 in the position shown in Fig. 3, when the roller 23 is lowered for the removal of the work, and is adapted to ride upon the work, under the weight of said bearing member, when the work is raised by the roller 23 into abrading position, as shown in Fig. 1. To relieve the pressure of said hold-back roller upon the work, in case it is found excessive, the bearing member 72 is connected by a push-link 79 with a vertical slide-bar 80 mounted on the frame 10, and said slide bar is connected by a chain 81, passing over a pulley 82, to a counter-weight 83 for said bearing member.

In the operation of the device, assuming that the machine is as shown in Fig. 1, an abrading operation being completed, the upper end of the cylinder 45 is charged, turning the rock-shafts 18 and 19 clockwise as viewed in Figs. 1 and 3, lifting the rollers 22 and 25 and lowering the roller 23 and guide pins 24, 24ª, while the foot 39ª of the lever 39 passes to the left until it clears the transverse slot 17ᵇ so as to slide in the longitudinal slot 17ª of the bar 17, the parts then being as shown in Fig. 3. As soon as said foot 39ª has thus cleared said slot 17ᵇ, the spring 27 and the weight 38 immediately slide the carriage 16, with the finished work thereon, away from the frame 10, upon the bar 17 and rock-shaft 18. As the carriage starts outward, the stud 56 leaves the latching lever 52, which thereupon, impelled by its spring 54, engages the arm 51 to prevent turning of the rock-shaft 18 in the opposite direction while the carriage is out.

When the carriage has reached it outermost position, where it is stopped by the collar 44, the operator removes the buffed beads and replaces them with beads to be buffed, by simply hanging the latter upon the rollers 22, 23, between the guideposts 24, 24ª, and immediately before or after doing so he exhausts the upper end and charges the lower end of the cylinder 45. He then depresses the treadle 30, thereby pulling the carriage 16, against the action of the spring 27 and weight 38, back to abrading position, where the foot 39ª of the lever 39 is free to slide in the transverse slot 17ᵇ, and the stud 56, striking the latching lever 52, releases the rock-shaft 18, which is promptly turned by the previously charged cylinder 45, and said cylinder also lowers the roller 25 onto the work, while the roller 22 is lowered and the roller 23 raised, to bring the work against the abrading wheels 13, 14 and the hold-back roller 26, which are being driven by the belt 68, and the several parts of the machine are again in the positions shown in Fig. 1.

The machine is rapid in operation, no time being lost between the tilting of the work-supporting rolls out of pressing position and the outward movement of the carriage under action of the spring 27 and weight 38, nor between the inward movement of the carriage and the tilting of the work-suporting rolls to abrading position under action of the cylinder 45. The abrading wheels are in no danger of contacting other parts of the machine which might cause them to fly to pieces, nor to be jammed by the work in the axial movement of the latter, since the work suporting rollers and associated parts mounted on the carriage cannot be tilted into abrading or pressing position until the carriage 16 has completed its inward movement. The hold-back roller 26 being driven at a constant speed relative to that of the abrading wheels, a uniform action upon the work, and consequently an improved product, is obtained. The machine may readily be adapted to abrade annular articles of different sizes, and is largely automatic.

Modifications may be resorted to within the scope of our invention, and we do not wholly limit our claims to the specific construction shown.

We claim:

1. In an abrading machine for a resiliently flexible strip of material, the combination of a pair of abrading wheels spaced apart longitudinally of the work, said wheels being adapted simultaneously to abrade respective faces of the work as the latter passes between them, a work-engaging roller spaced from said wheels longitudinally of the work and so positioned as to cause the work to be progressively flexed against said wheels as it passes between them, driving means for said abrading wheels, and means associated with said driving means for causing the work to pass said wheels at a determinate, uniform speed with relation to the speed of said wheels.

2. In an abrading machine for a resiliently flexible, annular article, the combination of a pair of overhanging abrading wheels spaced apart longitudinally of the work, said wheels being adapted simultaneously to abrade respective faces of the work as the latter passes between them, and a work-supporting and guiding structure pivotally mounted adjacent said wheels and on an axis substantially parallel thereto, said structure being adapted in one angular position on its pivot to hold an annular article hung thereon with an upper reach of the article passing between but out of contact with said wheels, and in another angular position to hold the article flexed against both of said wheels.

3. In an abrading machine for a resiliently flexible strip of material, the combination of a pair of abrading wheels spaced apart longitudinally of the work, said wheels being adapted simultaneously to abrade respective faces of the work as the latter passes between them, and a work-supporting and guiding structure having one position in which it is adapted to support the work with a reach thereof passing between said wheels but out of contact therewith, and another position in which it is adapted to hold the work longitudinally flexed against said wheels, said structure extending to, and engaging the work only at points spaced from said wheels longitudinally of the work.

4. In an abrading machine for annular articles, the combination of a pair of substantially parallel, overhanging abrading wheels spaced apart longitudinally of the work and adapted simultaneously to abrade respective faces of the work as the latter passes between them, a work-carrying and guiding structure mounted for movement, axially of said wheels, into and out of association with the latter, and for pivotal movement about an axis parallel with the axis of said wheels, said structure thus being adapted to carry the work axially into association with said wheels, with a reach of the work lying between said wheels but out of contact therewith, and then to tilt the work with respect to said wheels to bring respective faces of the work into abrading contact with the respective wheels.

5. In an abrading machine for an annular article, the combination of a pair of spaced apart, overhanging abrading wheels having annular abrading surfaces on their outer peripheries, the abrading surface of each being aligned with that of the other, a pair of spaced apart guide members adapted pendulously to support said annular article by contact with its inner periphery, means for moving said guide members axially toward said abrading wheels to carry a reach of said article between the latter, and means for then moving said guide members oppositely, in directions transverse to their first movement to bring opposite sides of said reach of the article into contact with the respective abrading wheels.

6. In an abrading machine for an annular article, the combination of a pair of projecting abrading wheels adapted simultaneously to abrade opposite sides of the work at different stations thereon, guide rollers for the work spaced apart from said abrading wheels and adapted to hold the work against the latter, and a projecting hold-back roller for the work, said parts being adapted to permit the free insertion of the work between said abrading wheels.

7. In an abrading machine for an annular article, the combination of a pair of parallel shafts, a pair of aligned abrading wheels secured to said shafts respectively and adapted to abrade opposite sides of the work, a hold-back roller for the work, a mounting for said roller pivoted concentrically with one of said shafts, and driving means operatively connecting said shaft with said roller. said abrading wheels and said hold-back roller being adapted freely to receive the work from an axial direction.

8. In an abrading machine for resilient, endless tire beads, the combination of an abrading wheel formed of rigid material and mounted in a fixed position and adapted to abrade the inner periphery of the bead, and an abrading wheel formed of rigid material and mounted in a fixed position at a distance from the first said abrading wheel and adapted to abrade the outer periphery of the bead, said wheels being overhung, so that the bead may be freely inserted between them and then caused, by being tilted, to bear simultaneously against said wheels under pressure of its own resilience.

9. In an abrading machine for resilient strip material, the combination of an abrading wheel formed of rigid material and mounted in a fixed position and adapted to abrade one side of the work, and an abrading wheel formed of rigid material mounted in a fixed position at a different station on the work and adapted to abrade the opposite side of the work, said wheels being so positioned that the work may be held against them simultaneously by its own resilience without the use of guiding means at or between the stations of said wheels.

10. In a machine for abrading an annular article, the combination of a pair of spaced apart, abrading wheels adapted to abrade opposite sides of the work and to receive the latter freely between them, a carriage slidably mounted for movement from and toward said wheels, and a work-supporting and guiding structure pivotally mounted on said carriage, said structure being adapted pendulously to support the work and carry it freely between said wheel when said carriage is moved toward the latter, and to tilt the work into contact with both of said wheels when then turned on its pivot.

11. In an abrading machine for an annular article, the combination of spaced apart abrading wheels adapted to abrade opposite sides of the work and to receive the latter freely between them, a carriage slidably mounted for movement toward and from said wheels to introduce the work thereto and remove it therefrom, a work-supporting and guiding structure pivoted on said carriage and adapted to be turned on its pivot to press the work against said wheels after it has been inserted between the latter, driving means adapted to turn said structure about its pivot toward said pressing position, and a latch adapted to prevent the action of said driving means while said carriage is out of abrading position.

12. In an abrading machine for an annular article, the combination of spaced apart abrading wheels adapted to abrade opposite sides of the work and to receive the latter freely between them, a carriage slidably mounted for movement toward and from said wheels to introduce the work thereto and remove it therefrom, a work-supporting and guiding structure pivoted on said carriage and adapted to be turned on its pivot to press the work against said wheels after it has been inserted between the latter, driving means adapted to turn said structure about its pivot toward said pressing position, a latch adapted to prevent the action of said driving means while said carriage is out of abrading position, and means for automatically tripping said latch when said carriage reaches abrading position.

13. In an abrading machine for an annular article, the combination of spaced apart abrading wheels adapted to abrade opposite sides of the work and to receive the latter freely between them, a carriage slidably mounted for movement toward and from said wheels to introduce the work thereto and remove it therefrom, a work-supporting and guiding structure pivoted on said carriage and adapted to be turned on its pivot to press the work against said wheels after it has been inserted between the latter, yielding means adapted to urge said carriage away from said wheels, and means for forcing it toward said wheels against the action of said yielding means.

14. In an abrading machine for an annular article, the combination of spaced apart abrading wheels adapted to abrade opposite sides of the work and to receive the latter freely between them, a carriage slidably mounted for movement toward and from said wheels to introduce the work thereto and remove it therefrom, a work-supporting and guiding structure pivoted on said carriage and adapted to be turned on its pivot to press the work against said wheels after it has been inserted between the latter, yielding means adapted to urge said carriage away from said wheels, means for forcing it toward said wheels against the action of said yielding means, means for latching it in abrading position against said yielding means, and means for turning said work-supporting and guiding structure about its pivot.

15. In an abrading machine for an annular article, the combination of spaced apart abrading wheels adapted to abrade opposite sides of the work and to receive the latter freely between them, a carriage slidably mounted for movement toward and from said wheels to introduce the work thereto and remove it therefrom, a work-supporting and guiding structure pivoted on said carriage and adapted to be turned on its pivot to press the work against said wheels after it has been inserted between the latter, yielding means adapted to urge said carriage away from said wheels, means for forcing it toward said wheels against the action of said yielding means, means for latching it said yielding means, means for latching it in abrading position against said yielding means, means for turning said work-supporting and guiding structure about its pivot, and means actuated by the movement of said structure for releasing said latching means.

16. In an abrading machine for an annular article, the combination of spaced apart abrading wheels adapted to abrade opposite sides of the work and to receive the latter freely between them, a carriage slidably mounted for movement toward and from said wheels to introduce the work thereto and remove it therefrom, a work supporting and guiding structure pivoted on said carriage and adapted to be turned on its pivot to press the work against said wheels after it has been inserted between the latter, positive means for preventing the turning of said structure to pressing position while said carriage is out of abrading position, and positive means for preventing the movement of said carriage out of abrading position while said structure is in pressing position.

17. In an abrading machine for a resiliently flexible strip of material, the combination of a pair of abrading wheels spaced apart longitudinally of the work, said wheels being adapted simultaneously to abrade respective faces of the work as the latter passes between them, a work-guiding roller operatively aligned with said abrading wheels and spaced therefrom longitudinally of the work, said roller being so positioned as to cause the work to be progressively flexed as it passes said roller and said wheels, and thereby to be held in abrading contact with said wheels, a roller adapted to engage the work to control the speed of its passage past said abrading wheels, and positive driving means operatively connecting the last said roller and said abrading wheels, said means being adapted to insure uniform relative movement of the work and the abrading wheels.

In witness whereof we have hereunto set our hands this 7 day of April, 1922.

ROBERT R. AMBLER.
GEORGE F. WILSON.